UNITED STATES PATENT OFFICE.

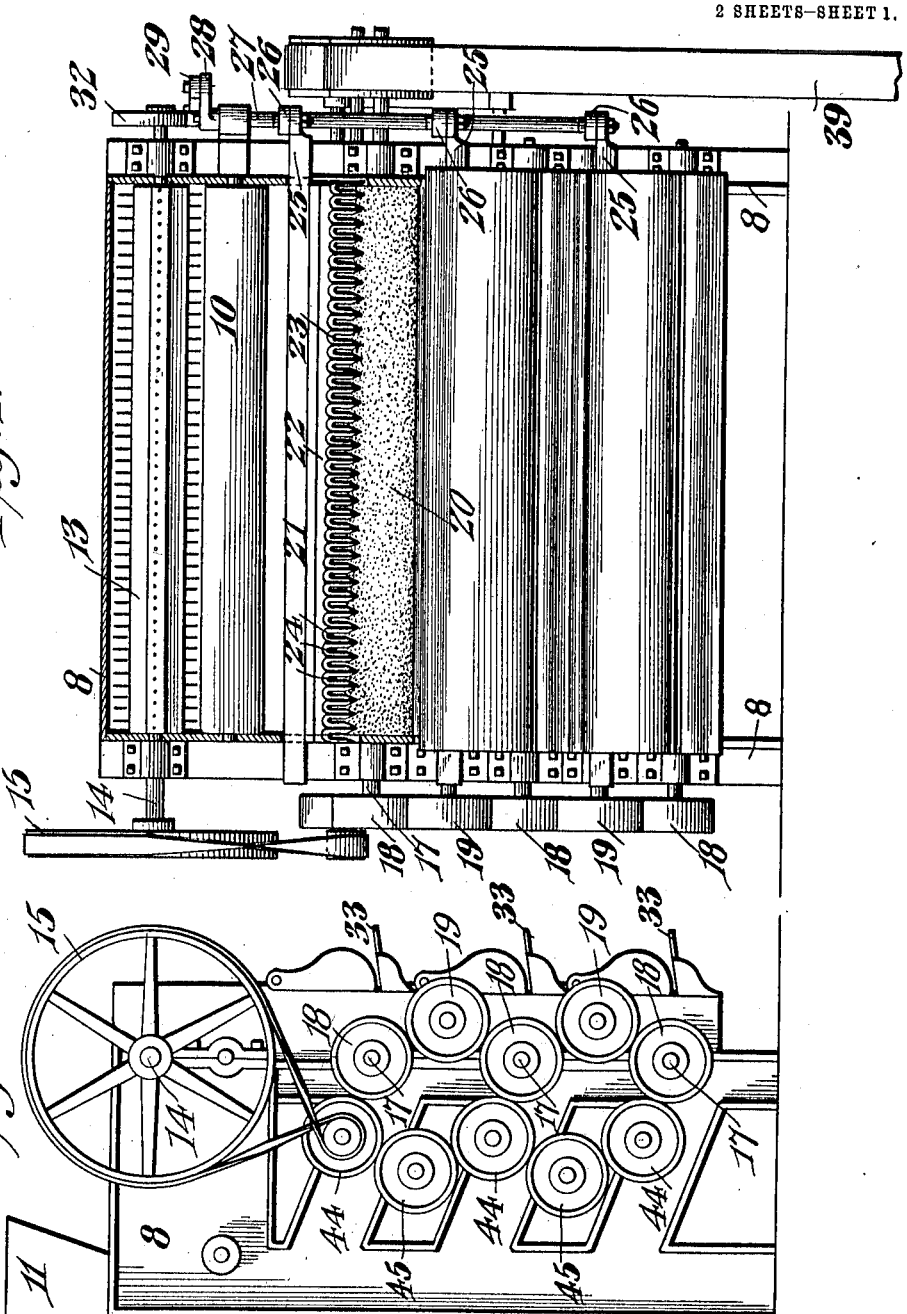

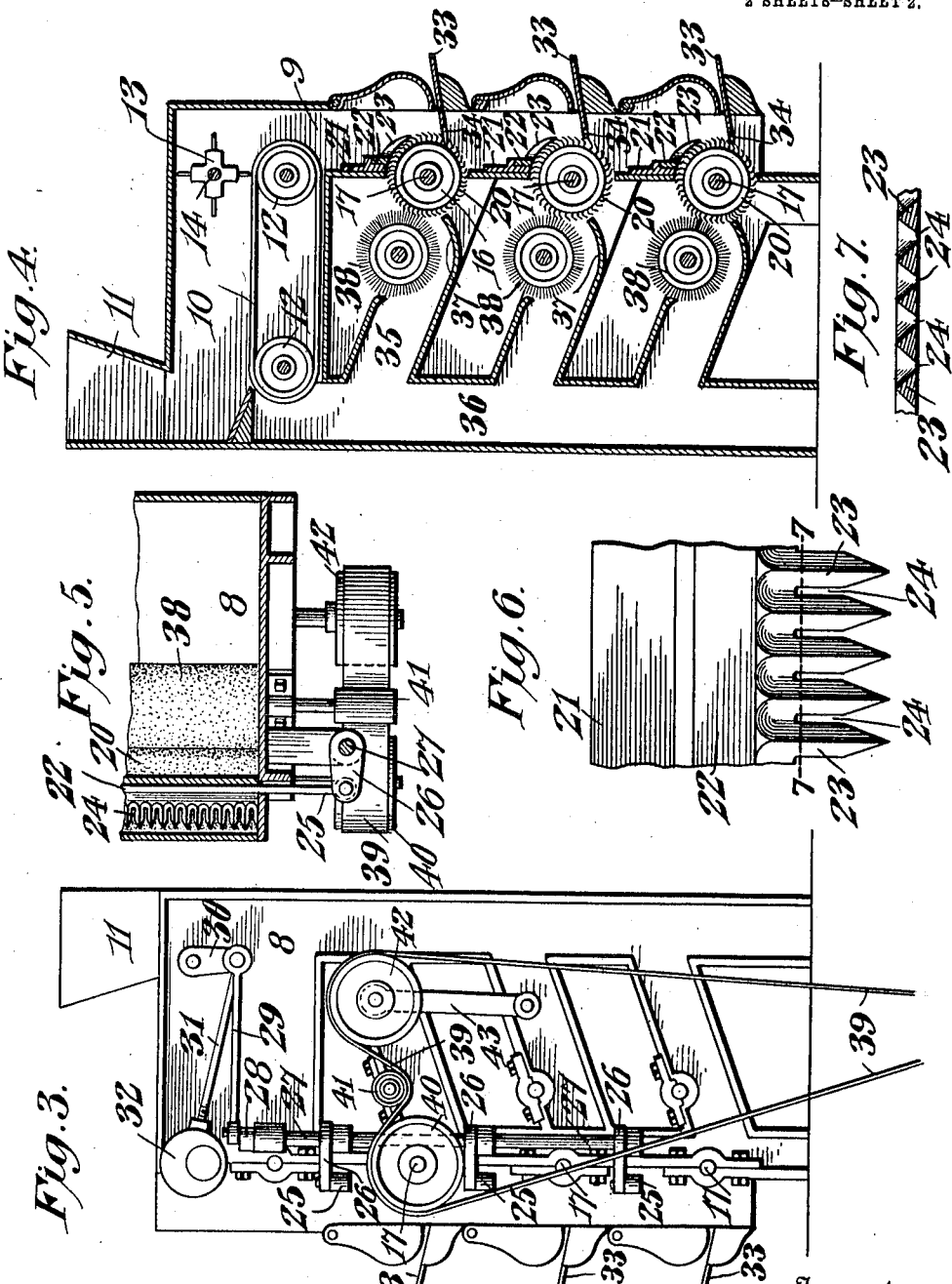

WINFIELD S. CANNADAY, OF FLORENCE, ALABAMA.

DELINTING-MACHINE.

1,035,316.  Specification of Letters Patent.  Patented Aug. 13, 1912.

Application filed July 7, 1910. Serial No. 570,895.

*To all whom it may concern:*

Be it known that I, WINFIELD S. CANNADAY, a citizen of the United States, residing at Florence, in the county of Lauderdale and State of Alabama, have invented a new and useful Delinting-Machine, of which the following is a specification.

This invention relates to improvements in means for removing the lint from cotton seed, and the primary object is to provide novel and simple mechanism, which will very thoroughly remove the lint without injuring the fiber, thus saving a material amount that now ordinarily goes to waste and leaving completely denuded seed that will be in better condition for planting and shipment, and will produce a greater amount of oil and meal than those to which small particles of lint still cling.

The preferred embodiment of the invention is illustrated in the accompanying drawings, wherein:—

Figure 1 is a side elevation of the machine. Fig. 2 is a front view partly in elevation and partly in section. Fig. 3 is an elevation of the side opposite to that shown in Fig. 1. Fig. 4 is a vertical sectional view through the machine. Fig. 5 is a detail horizontal sectional view. Fig. 6 is a detail view of a portion of one of the stripping members. Fig. 7 is a detail sectional view on the line 7—7 of Fig. 6.

Similar reference numerals designate corresponding parts in all the figures of the drawings.

In the embodiment illustrated, a suitable casing 8 is employed, in the front portion of which is arranged a vertical passageway 9 for the seed, said seed being fed to the passageway by any suitable means, as for instance an endless belt 10 operating beneath a receiving hopper 11 and about pulleys 12 driven by any suitable means. Arranged over the delivery portion of the belt, is a rotary brush 13, which removes the seed from said belt, permitting the same to fall downward through the passageway 9. The brush 13 is mounted on a shaft 14, which projects from the machine, and has on its projecting end a pulley 15. A plurality of rotatable delinting drums 16 are mounted one below the other in the casing and have their advanced portions projecting into the passageway 9, as shown in Fig. 4. These drums are mounted on shafts 17 projecting from one end of the casing and having friction rollers 18 or other suitable driving devices mounted on the projecting ends. Idlers 19 are interposed between the said rollers. The drums 16 are each covered with card clothing 20, the wires being, as is customary, bent in the direction of rotation. Directly over each delinting drum 16 is a guide 21 in which there is mounted for reciprocation a stripping member comprising a bar 22 carrying fingers or teeth 23 curved concentrically to the axis of rotation of the drum and partly overhanging the drum on the rising side thereof. The fingers or teeth are substantially triangular in cross section, being pointed at their free ends and separated by elongated spaces 24 so that between each pair of teeth there is formed a pocket or seat expanding from the drum side approximately radially outward therefrom. The teeth are located in each passageway 9 into which the seed are deposited for action by the respective delinting drum. That portion of the drum entering the corresponding passageway 9 constitutes in action the rising or lifting side of the drum. The card clothing engages the cotton fibers on the seed and lifts the seed until they enter the seats or pockets between the teeth where the seed are held until the lint is stripped therefrom, whereupon the seed gravitate from these seats again into the path of the rising card clothing and shorter strands of lint not stripped by the first engagement are caught by the card clothing and the seed are again subjected to the stripping action, the operation being repeated until the seed are denuded wholly of adherent lint. The bars 22 have portions 25 projecting from one end of the casing and connected to these portions are cranks 26 mounted on an upright rock shaft 27 journaled on the adjacent end of the machine. The upper end of this rock shaft is provided with another crank 28 having a link connection 29 with a swinging arm 30. A pitman 31, connected to the arm 30, also has a connection with a suitable eccentric 32 fastened to one of the shafts of the pulleys 12. Adjustable across the passageway 9 are retarding gates 33, which are slidably mounted in grooves or guides 34, formed in the walls of said passageway, one of these gates being arranged adjacent to each of the delinting drums below the set of fingers coacting with said drum.

The means for carrying the lint away from the delinting drums may be of any suitable character. Thus in the present embodiment, rearwardly and upwardly inclined lint conduits 35 are employed, one being arranged in rear of each drum, said conduits communicating at their rear ends with a vertical conduit 36. The bottoms of the conduits 35 have their lower ends inclined upwardly, as shown at 37, and disposed just in rear of the drums. A rotary doffing brush 38 is employed for each drum, and is journaled in the upper portion of each conduit 35 just in rear of the drum.

Any suitable driving mechanism for the machine may be employed. Thus in the present embodiment, a drive belt 39 is disclosed, which passes over a pulley 40 secured to one of the shafts 17. This belt passes beneath a pulley 41 secured to one of the brush shafts. A belt tightener pulley 42 is also employed, around which the belt 39 passes. This tightener is carried by a swinging arm 43. The various brushes are driven by the means shown in Fig. 1, that is to say, each of the brush shafts has a friction wheel 44, and arranged between the friction wheels and in engagement therewith are idlers or transmitting wheels 45.

When the machine is in operation cotton seed delivered into the hopper 11 will drop upon and be delivered from the belt 10 into the upper end of the passageway 9 along which the seeds gravitate until arrested by the first gate 33. Lint on the seed is caught by the wires of the card clothing as before explained, wherefore the seeds are lifted into the seats between the fingers 23 and the lint is removed as before explained, while, however, the seeds are turned over and stirred because of the reciprocatory movement of the bar provided with the fingers 23, and this operation continues until no more lint is engaged by the card clothing, whereupon the seed will fall past the gate 33 into the next section of the passageway 9. In the first compartment the longer fibers are removed, while in the successive compartments the shorter fibers of lint are removed. The reciprocatory movement of the bars 22 with the fingers 23 is such as to not only cause rotative movements of the seed while in the seats or pockets, but also brings practically all the card clothing into active operation insuring its even wear. The lint is carried by the delinting drums until engaged by the brushes 38 which not only doff the lint, but also serve to produce air blasts driving the lint into the conduit 36, wherefrom it may be conveyed by any suitable means to other mechanism or to a place of storage.

Experience has demonstrated that the machine of the present invention not only thoroughly delints the seeds, but gins the fiber, thereby increasing the value of both the seeds and the fiber obtained therefrom.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

1. In a machine of the character set forth, the combination with a rotary delinting member having a surface of card clothing, of a stripping member in close relation to the periphery of the delinting member, said stripping member having teeth curved concentrically with the surface of the stripping member and extending downward from their basic ends to their free ends in operative relation to the uptraveling side of the delinting member when the latter is rotating.

2. In a machine of the character set forth, the combination with a rotary delinting member having a surface of card clothing, of a stripping member in close relation to the periphery of the delinting member, said stripping member having teeth curved concentrically with the surface of the stripping member and extending downward from their basic ends to their free ends in operative relation to the uptraveling side of the delinting member when the latter is rotating, and means imparting a reciprocatory movement to the stripping member in a path substantially parallel with the axis of rotation of the delinting member.

3. In a machine of the character set forth, the combination with a rotary delinting member having an active surface of card clothing, of a stripping member comprising a series of curved fingers extending downwardly from their basic ends toward their free ends over the rising side of the delinting member, the fingers being in substantially concentric relation to the axis of rotation of the delinting member and each separated from the adjoining fingers by a space elongated in the direction of the length of the fingers and expanding in a direction away from the face toward the delinting member.

4. In a machine of the character set forth, the combination with a rotary delinting member having an active surface of card clothing, of a stripping member comprising a series of curved fingers extending downwardly from their basic ends toward their free ends over the rising side of the delinting member, the fingers being in substantially concentric relation to the axis of rotation of the delinting member and each separated from the adjoining fingers by a space elongated in the direction of the length of the fingers and expanding in a direction away from the face toward the delinting member, and means for imparting reciprocatory motion to the series of fingers in a direction substantially parallel with the axis of rotation of the delinting member.

5. In a machine of the character set forth, the combination with a rotary delinting drum, of a seed engaging member extending longitudinally of the drum and provided with a series of fingers curved substantially concentric with the axis of rotation of the drum and throughout their length extending downward along the uprising side of the drum, the fingers being spaced apart one from the other and contracting in cross section toward the face remote from the drum with the free ends of the fingers pointed, to form elongated seed receiving pockets of constantly increasing width from the drum side toward the side remote from the drum.

6. In a machine of the character set forth, the combination with a passageway for the cotton seed, of a plurality of rotary delinting drums located one below the other and having their forward portions operating in the passageway, said drums having their outer faces covered with card clothing, longitudinally reciprocating bars located over the drums and carrying transversely disposed downwardly curved fingers that project into the passageway over said drums, and in advance of the same, doffing brushes arranged in rear of the drums for removing the lint therefrom, means for simultaneously rotating the drums, and reciprocating the bars, and retarding devices adjustable across the passageway toward and from the drums below the fingers.

In testimony, that I claim the foregoing as my own, I have hereto affixed my signature in the presence of two witnesses.

WINFIELD S. CANNADAY.

Witnesses:
RICARD V. HOLLAND,
O. B. HILL.

---

Copies of this patent may be obtained for five cents each, by addressing the "Commissioner of Patents, Washington, D. C."